(12) United States Patent
Kashiwabara et al.

(10) Patent No.: US 6,778,384 B2
(45) Date of Patent: Aug. 17, 2004

(54) ON-VEHICLE CARD HOLDING MECHANISM FOR ACCOMMODATING CARDHOLDER TO HOLD MEMORY CARD

(75) Inventors: Fumihiko Kashiwabara, Miyagi-ken (JP); Hiroyuki Miyaguchi, Miyagi-ken (JP); Nobuaki Iwamoto, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 15 days.

(21) Appl. No.: 10/300,966

(22) Filed: Nov. 21, 2002

(65) Prior Publication Data

US 2003/0100977 A1 May 29, 2003

(30) Foreign Application Priority Data

Nov. 29, 2001 (JP) .......................................... 2001-364577

(51) Int. Cl.[7] .............................................. G06K 13/08
(52) U.S. Cl. ............................ 361/684; 361/737; 701/1
(58) Field of Search ........................ 361/737, 679–687, 361/724–727; 701/1; 705/42, 50; 235/379, 380

(56) References Cited

U.S. PATENT DOCUMENTS 5,370,223 A  * 12/1994  Leicht, Jr. ................... 206/232
5,995,898 A  * 11/1999  Tuttle .......................... 701/102
6,113,403 A     9/2000  Oguchi ........................ 439/159
6,672,421 B2 *  1/2004  Larsson et al. ............. 180/271

FOREIGN PATENT DOCUMENTS

EP          0 964 357        12/1999
JP        Hei 10-154210       6/1998

* cited by examiner

Primary Examiner—Hung Van Duong
(74) Attorney, Agent, or Firm—Brinks Hofer Gilson & Lione

(57) ABSTRACT

According to this invention, when a user presses a manipulation part, a slider is pressed to a cardholder integrated with the manipulation part to move against a spring force of coil springs, which releases engagement of a protruding part at a center of a heart-shaped cam with a pin. When the manipulation part is released from being pressed, the cardholder is pushed out by the coil springs through the slider, and the manipulation part protrudes from a surface of an instrument panel. When the user holds the manipulation part to pull it out, a force acts on second pawls from first pawls through slant faces, which bends rods to release engagement of the first pawls with the second pawls.

2 Claims, 3 Drawing Sheets

ON-VEHICLE CARD HOLDING MECHANISM FOR ACCOMMODATING CARDHOLDER TO HOLD MEMORY CARD

BACKGROUND OF THE INVENTION

1. Field of the Invention

The present invention relates to an on-vehicle card holding mechanism provided on an instrument panel of a vehicle for mounting instruments and switches, etc. on the front of a driver's seat, which accommodates a cardholder to hold a memory card, and allows the memory card to be electrically connected to specific instruments.

2. Description of the Related Art

A conventional on-vehicle card holding mechanism includes a cardholder to hold a memory card, a case having an opening through which the cardholder is inserted in and pulled out, installed on an instrument panel situated on the front of a driving seat, on which instruments and switches, etc., are mounted, and a connection means that, when the cardholder holding the memory card is inserted into the case, electrically connects the memory card to specific instruments.

On the instrument panel, a hole is formed to locate the opening of the case. On the edge of this hole, a recess is provided in order to easily catch the cardholder by a finger when a user pulls out the cardholder.

Now, in order to use the instrument panel for a vehicle as a common component, regardless of grades of the vehicles, an arrangement is often made which provides the above recess to the instrument panels of almost all the grades of vehicles. Therefore, with regard to an instrument panel of the grade to which the card holding mechanism is not provided, the hole provided on the instrument panel is covered with a specific member, but the recess remains as it is, thus marring beauty of the instrument panel.

On the other hand, with regard to an instrument panel of the grade to which the card holding mechanism is provided, the operation buttons and knobs mounted on the instrument panel are pressed or rotated; however, only the cardholder is pulled out by hooking a finger on the recess, which deteriorates easiness for manipulation.

SUMMARY OF THE INVENTION

The present invention has been made in view of the above circumstances, and an object of the invention is to provide an on-vehicle card holding mechanism that allows a cardholder to be pulled out without providing a recess to an instrument panel.

In order to achieve the above object, the on-vehicle card holding mechanism according to the invention includes: a cardholder to hold a memory card; a case attached to an instrument panel on which instruments and switches are mounted on a front of a driver's seat, having an opening into which the cardholder is inserted; connection means that electrically connect the memory card to specific instruments when the cardholder holding the memory card is housed in the case; restraint means that restrain the cardholder from a move to a pullout direction of the cardholder when the cardholder is housed in the case; release means that release the restraint of the move to interlock with a pressing operation to the cardholder in a state that the cardholder is housed in the case; and extrusion means that extrude the cardholder so that the cardholder protrudes from a surface of the instrument panel when the release means release the restraint.

In the invention being thus constructed, the memory card is held by the cardholder, the cardholder is inserted in the opening of the case to be housed in the case, and electrical connections are made possible between the memory card and specific instruments. Here, since the restraint means restrains the cardholder from a move to the pullout direction, the memory card is electrically connected to the specific instruments in a stable condition.

When the cardholder is pressed, the release means release the cardholder from the restraint of the move to the pullout direction, and the extrusion means push out the cardholder from the opening of the case. The cardholder having the restraint of the move to the pullout direction released protrudes from the surface of the instrument panel; the operator is able to hold the protruded part of the cardholder and pull out the cardholder accordingly.

Thus, in this invention, since a pressing operation of the cardholder protrudes the cardholder from the surface of the instrument panel, the operator is only required to hold the protruded part of the cardholder to pull out the cardholder. That is, the operator can pull out the cardholder without a recess provided on the instrument panel.

In the above invention, the restraint means and the release means include: first pawls provided to the cardholder; second pawls provided to the case, which are engaged with the first pawls when the cardholder is housed in the case; slant faces that slant in a direction of a force affected when the cardholder is pulled out, which are formed on at least one of contacts of the first pawls to the second pawls and contacts of the second pawls to the first pawls; allowance parts provided to at least one of the first pawls and the second pawls, which allow the pawls to move in a perpendicular direction to the pullout direction; restraints that restrain moves of the pawls by the allowance parts when the cardholder is housed; a slider energized in the pullout direction, which moves along with correspondents of the first pawls and the second pawls; and a cam that positions the slider so that the pawls with the allowance parts provided become movable in the perpendicular direction when the cardholder is pressed in the state of being housed in the case, and positions the slider so that the moves of the pawls with the allowance parts provided are restrained by the restraints when the cardholder is housed in the case.

In the invention thus constructed, when the cardholder is housed in the case, the cam positions the slider in such a manner that the restraints restrain the pawls with the allowance parts provided from the moves to the perpendicular direction to the pullout direction of the cardholder. Thereby, the first pawls and the second pawls are maintained in a state of engagement.

When the cardholder is pressed, the cam positions the slider in such a manner that the pawls with the allowance parts provided become movable in the perpendicular direction to the pullout direction of the cardholder. In this state, the force in the pullout direction acts on the pawls with the allowance parts provided through the slant faces, and the pawls move perpendicularly to the pullout direction of the cardholder accordingly. Thereby, the first pawls and the second pawls slide, and the first pawls move to the pullout direction of the cardholder.

Thus, the card holding mechanism according to the invention is able to securely perform the restraint of the move to the pullout direction of the cardholder and the release of the restraint.

BRIEF DESCRIPTION OF THE DRAWINGS

FIG. 3 is a sectional view illustrating the operations of a first pawl and a second pawl, and the operations of a heart-shaped cam of this embodiment, in which

DETAILED DESCRIPTION OF THE PREFERRED EMBODIMENT

One embodiment of the cardholder of the invention will be described with reference to the accompanying drawings.

Figure 1:
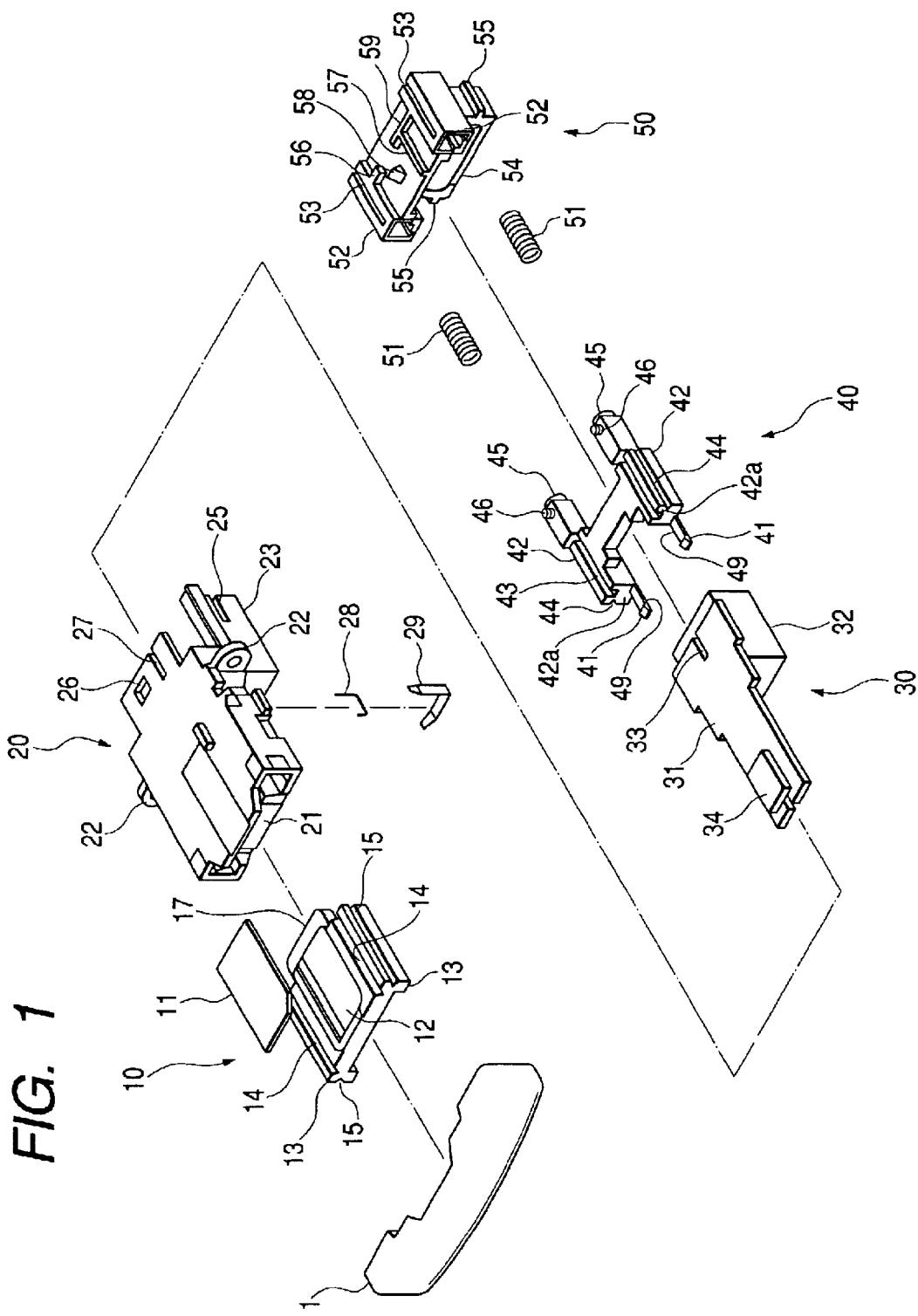
FIG. 1 is an exploded perspective view illustrating one embodiment of the cardholder of the present invention.

FIG. 1 is an exploded perspective view illustrating this embodiment, FIG. 2 is a perspective view illustrating the operation steps to pull out the cardholder of this embodiment from a case, and FIG. 3 is a sectional view illustrating the operations of a first pawl and a second pawl, and the operations of a heart-shaped cam of this embodiment.

Although not illustrated, this embodiment is installed in instrument panel on the front of the driver's seat, on which instruments and switches are mounted. As shown in FIG. 1, the embodiment includes a cardholder 10 to hold a small memory card 11, which is integrally mounted with a manipulation part 1 to receive a manual pressing operation, a case 20 attached to the instrument panel, having an opening 21 into which the cardholder 10 is inserted, and connection means 30 that electrically connect the small memory card 11 to specific instruments when the cardholder 10 holding the small memory card 11 is housed in the case 20.

The manipulation part 1 is adjacently placed to other operation buttons 2 through 5 mounted on the instrument panel, as shown in FIG. 2.

The cardholder 10 includes, as shown in FIG. 1, a card holder 12 to hold the small memory card 11, and slider-guides 13 each provided on both sides of the card holder 12, which guide the cardholder 10 to be inserted into the case 20. Guide grooves 14, 15 each are formed on the upper sides and both sides of the slider-guides 13, on which protrusions made inside the case 20 which are not illustrated slide.

The case 20 includes the opening 21 into which the cardholder 10 is inserted, and mounting parts 22 that fix the case 20 to a specific position, which are formed on both sides of the case 20. The case 20 also includes on the rear thereof, a connector cover 23 where the connection means 30 is attached, and notches 25, 27 formed on the rear of the case 20 for fitting a rear support member 50 that supports the connection means 30 and so forth, and a hole 26.

The connection means 30 includes a card connector 34 to take electric connections with terminals placed on the small memory card 11, which are not illustrated, a PCB 31 to mount the card connector 34 thereon, and an external connector 32 connected with the card connector 34 through the PCB 31, which connects the small memory card 11 to specific instruments.

Especially, the embodiment includes restraint means that restrain the cardholder 10 from a move to the pullout direction of the cardholder 10 when the cardholder 10 is housed in the case 20, release means that release the restraint of the move of the cardholder 10 to the pullout direction so as to interlock with a pressing operation to the cardholder 10 in the state that the cardholder 10 is housed in the case 20, and extrusion means that push the cardholder 10 out so that the cardholder 10 protrudes from the surface of the instrument panel when the release means release the restraint thereof.

The restraint means include, as shown in FIG. 1 and FIG. 3, a slider 40 provided to be slidable inside the case 20, which is energized in the pullout direction of the cardholder 10, first pawls 16, each of which is provided on each of both the lower sides of the slider-guides 13 of the cardholder 10, and second pawls 41 each provided on both sides of the slider 40, each of which is engaged with each of the first pawls 16 when the cardholder 10 is housed in the case 20.

Slider-guide parts 42 each are provided on both the sides of the slider 40. On both the upper faces and on both the side faces of the slider-guide parts 42, guide grooves 43, 44 are provided, in which protrusions, not illustrated, inside the case 20 slide.

Slant faces 41a that slant in the direction of the force affected when the cardholder 10 is pulled out are provided to at least one of contacts of the first pawls 16 to the second pawls 41 and contacts of the second pawls 41 to the first pawls 16, for example, to the second pawls 41 as shown in FIG. 3.

The release means include allowance parts that allow at least one of the first pawls 16 and the second pawls 41, for example the second pawls 41, to move in the perpendicular direction to the pullout direction of the cardholder 10, and restraints that restrain the moves of the second pawls 41 by the allowance parts when the cardholder 10 is housed.

That is, the allowance parts are flexible rods 49 provided to protrude on the front faces of the slider-guide parts 42 of the slider 40, on the fronts of which the second pawls 41 are formed. A difference in level is provided on the inner bottom face of the case 20, and the rods 49 are allowed to bend when the second pawls 41 are positioned on bottoms 20b lying one level lower.

The restraints are bottoms 20a lying one level higher than the foregoing bottoms 20b, and the rods 49 are restrained not to bend when the second pawls 41 are positioned on the bottoms 20a.

Figure 3A:
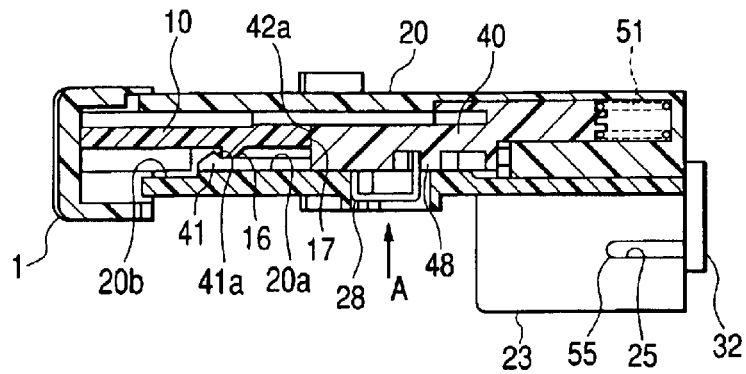
FIG. 3A, FIG. 3C, and FIG. 3E illustrate the operations from the engaged state of the first and second pawls to the state of the engagement being released.
Figure 3B:
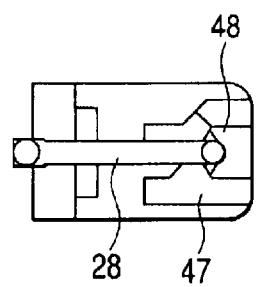
FIG. 3B illustrates the operation of the heart cam from the direction of the arrow A in FIG. 3A.
Figure 3C:
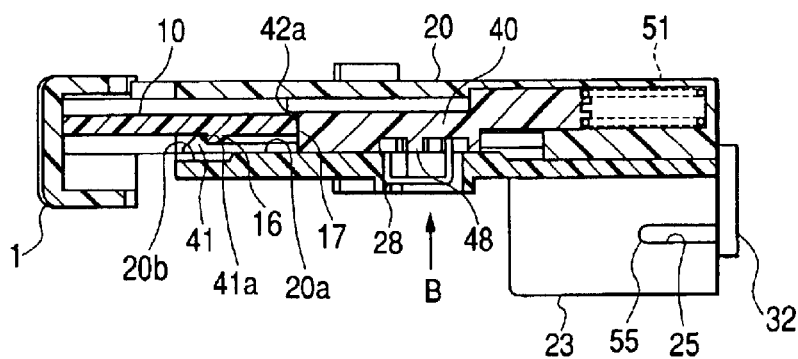
Figure 3D:
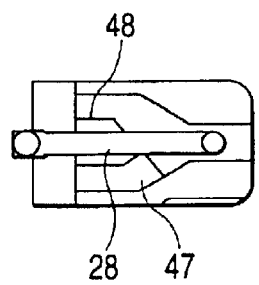
FIG. 3D illustrates the operation from the direction of the arrow B in FIG. 3C.
Figure 3E:
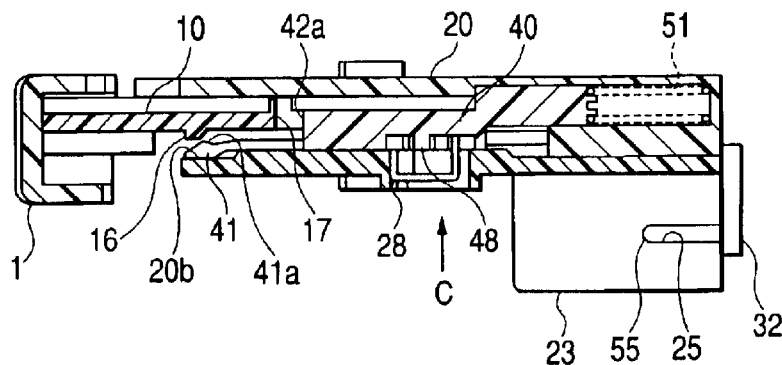
Figure 3F:
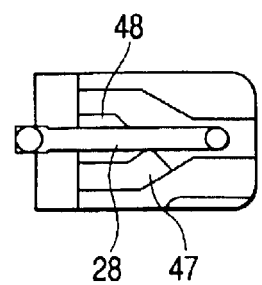
FIG. 3F illustrates the operation from the direction of the arrow C in FIG. 3E.

The slider 40 is provided with a heart-shaped cam 47 on one of the lower sides thereof, as shown in FIG. 3B, FIG. 3D, and FIG. 3F; and a pin 28 to follow this heart-shaped cam 47 is attached to the case 20.

The pin 28 is made of a U-shaped member, as shown in FIG. 1, and one end thereof is rotatably attached to the side of the case 20, and the other end thereof is located on the heart-shaped cam 47. A spring member 29 that presses the other end of the pin 28 to the heart-shaped cam 47 is located on the intermediate position of the pin 28, and the spring member 29 is attached to the case 20.

The heart-shaped cam 47 is set in such a manner that the pin 28 moves only in one direction by a heart-shaped protruding part 48 formed on the center of the heart-shaped cam 47 and plural slopes and plural level differences formed on the periphery of the protruding part 48.

That is, the heart-shaped cam 47 and the pin 28 set the positioning of the slider 40 such that the second pawls 41 are positioned on bottoms 20b lying one level lower when the cardholder 10 is pressed in the state of being housed in the case 20, as well as the positioning of the slider 20 such that the second pawls 41 are positioned on bottoms 20a lying one level higher when the cardholder 10 is housed in the case 20.

The slider 40 is provided on both sides of the rear thereof with spring mounts 45 that mount coil springs 51 for energizing the slider 40 to the pullout direction of the cardholder 10.

The slider 40 has the rear support member 50 for supporting the connection means 30, etc., attached on the rear thereof. The rear support member 50 includes an engagement part not illustrated, which a notch 33 provided to the connection means 30 is engaged with, and a frame-shaped support part 54 whereby the external connector 32 is supported. The rear support member 50 also includes spring chambers 52 on both sides thereof, which house the coil springs 51. The spring chambers 52 have slits 53 formed on the upper sides thereof, along the slide direction of the slider 40. The slider 40 has protrusions 46 formed on the rear upper sides thereof, and when the protrusions 46 are located inside the slits 53, the move of the slider 40 is restricted by the spring force of the coil springs 51.

The rear support member 50 includes on the upper side thereof projections 55, 57 and an engagement claw 58 that mate with the notches 25, 27 and the hole 26 provided to the case 20, and projections 56, 59 that make contacts with the edges of the case 20.

The extrusion means are made so as to bring the front faces 42a of the slider-guide parts 42 provided to the slider 40 into contact with a rear end face 17 of the cardholder 10, and thereby the spring force of the coil springs 51 is given to the cardholder 10.

The embodiment thus constructed operates as follows, when the cardholder 10 is pulled out from the case 20.

Figure 2A:
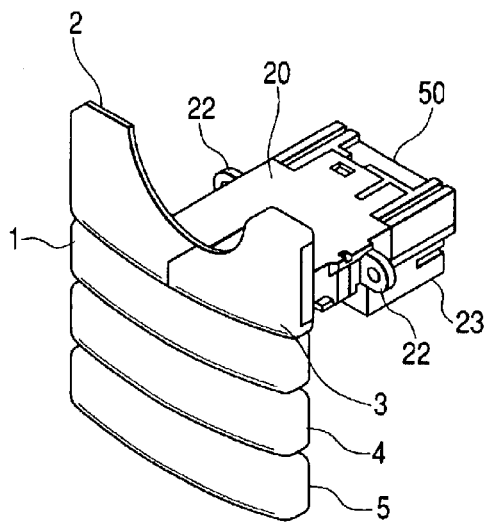
FIG. 2 is a perspective view illustrating the operation steps to pull out the cardholder of this embodiment.

As shown in FIG. 2A, the cardholder 10 is housed in the case 20. Here, the front face of the manipulation part 1 stays on the same plane as the front faces of the adjacent operation buttons 2 through 5. Inside the case 20, as shown in FIG. 3A and FIG. 3B, since the protruding part 48 at the center of the heart-shaped cam 47 is engaged with the pin 28, the slider 40 is restrained not to move in the pullout direction of the cardholder 10.

Figure 2B:
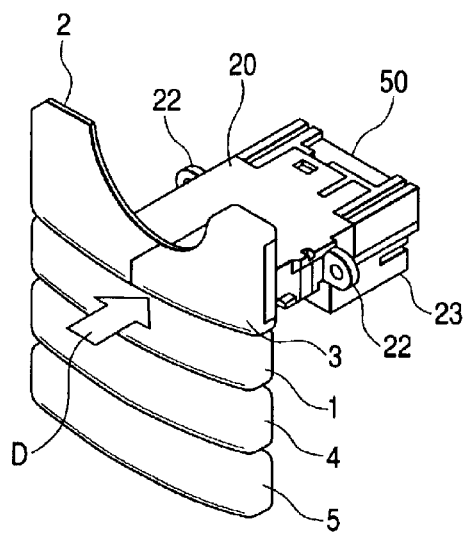
Figure 2C:
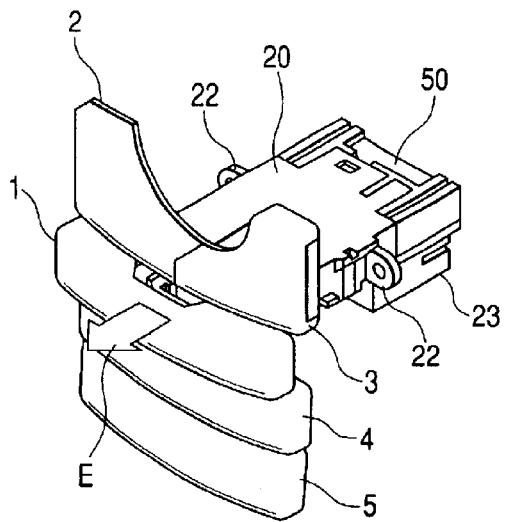

As shown in FIG. 2B, when the manipulation part 1 is pressed to the D direction, the manipulation part 1 is indented a little against the adjacent operation buttons 2 through 5. Here, inside the case 20, the slider 40 is pressed to the cardholder 10, the slider 40 moves against the coil springs 51. Accompanied with this, as shown in FIG. 3D, the engagement of the protruding part 48 at the center of the heart-shaped cam 47 with the pin 28 is released, the slider 40 is permitted to move in the energizing direction, as shown in FIG. 3C, the slider 40 is pushed out by the spring force of the coil springs 51, and the cardholder 10 is pushed out by the slider 40. Thereby, as shown in FIG. 2C, the manipulation part 1 is pushed out to the E direction, and the cardholder 10 is protruded from the surface of the instrument panel, that is, from the surfaces of the adjacent operation buttons 2 through 5.

At this stage, inside the case 20 as shown in FIG. 3C, since the second pawls 41 move to be placed on the bottoms 20b lying one level lower, the second pawls 41 become movable to comply with the flexibility of the rods 49 in the perpendicular direction to the pullout direction of the cardholder 10.

Figure 2D:
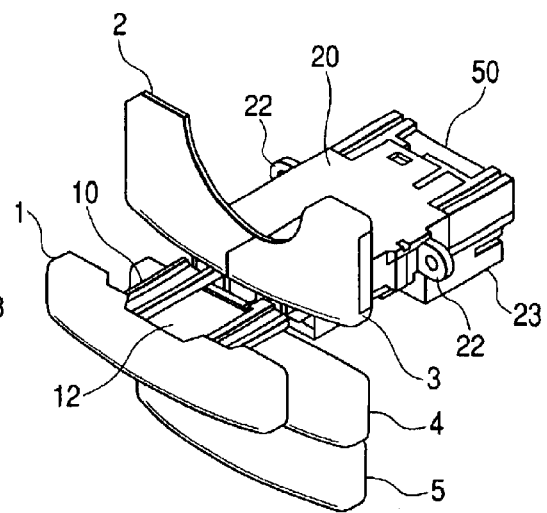

When the cardholder 10 is pulled out in this state, inside the case 20, the force in the pullout direction given to the cardholder 10 acts on the second pawls 41 from the first pawls 16 through the slant faces 41a provided on the second pawls 41. That is, the force perpendicular to the pullout direction of the cardholder 10 acts on the second pawls 41, the rods 49 integrally formed with the second pawls 41 bend with this action, and the second pawls 41 move perpendicularly to the pullout direction of the cardholder 10 to follow this flexure. Thereby, the first pawls 16 slide on the slant faces 41a to move to the pullout direction, and this move releases the engagement of the first pawls 16 with the second pawls 41, as shown in FIG. 3E. Thus, as shown in FIG. 2D, the operator is able to hold the manipulation part 1 and pull out the cardholder 10.

Thus, according to this embodiment, a pressing operation of the manipulation part 1 protrudes the manipulation part 1 from the surface of the instrument panel, and the operator is able to hold the extruded manipulation part 1 and pull out the cardholder 10. Therefore, this embodiment does not need to provide the recess on the instrument panel, which enhances beauty of the instrument panel.

Further, according to this embodiment, the pressing operation of the manipulation part 1 harmonizes with the pressing and rotating operations of the operation buttons and knobs provided to surround it, thus enhancing manipulability.

Further, according to this embodiment, switches and materials can be placed in the neighboring areas, as the operation buttons 2 through 5, which enhances the use of space of the instrument panel.

As mentioned above, the invention makes it possible to protrude the cardholder from the surface of the instrument panel by a pressing operation of the cardholder, and enables the operator to hold a protruded part of the cardholder and pull out the cardholder; therefore, the cardholder can be pulled out without providing the recess on the instrument panel, which enhances beauty of the instrument panel.

Also in the invention, the pressing operation of the cardholder harmonizes with the pressing and rotating operations of the operation buttons and knobs provided to surround it, which enhances manipulability.

Also in the invention, other switches and materials can be placed in the neighboring areas, thereby enhancing the use of space of the instrument panel.

What is claimed is:

1. An on-vehicle card holding mechanism comprising:
   a cardholder to hold a memory card;
   a case attached to an instrument panel on which instruments and switches are mounted on a front of a driver's seat, having an opening into which the cardholder is inserted;
   a connector that electrically connects the memory card to specific instruments when the cardholder holding the memory card is housed in the case;
   a restraint mechanism that restrains the cardholder from a move to a pullout direction of the cardholder, when the cardholder is housed in the case;
   a release mechanism that releases the restraint of the move to interlock with a pressing operation to the cardholder in a state that the cardholder is housed in the case; and
   an extrusion mechanism that extrude the cardholder so that the cardholder protrudes from a surface of the instrument panel when the release mechanism releases the restraint.

2. An on-vehicle card holding mechanism according to claim 1, wherein the restraint mechanism and the release mechanism include:
   first pawls provided to the cardholder;
   second pawls provided to the case, which are engaged with the first pawls when the cardholder is housed in the case;
   slant faces that slant in a direction of a force affected when the cardholder is pulled out, which are formed on at least one of contacts of the first pawls to the second pawls and contacts of the second pawls to the first pawls;
   allowance parts provided to at least one of the first pawls and the second pawls, which allow the pawls to move in a perpendicular direction to the pullout direction;
   restraints that restrain moves of the pawls by the allowance parts when the cardholder is housed;
   a slider energized in the pullout direction, which moves along with correspondents of the first pawls and the second pawls; and
   a cam that positions the slider so that the pawls with the allowance parts provided become movable in the perpendicular direction when the cardholder is pressed in the state of being housed in the case, and positions the slider so that the moves of the pawls with the allowance parts provided are restrained by the restraints when the cardholder is housed in the case.

* * * * *